Patented Apr. 20, 1954

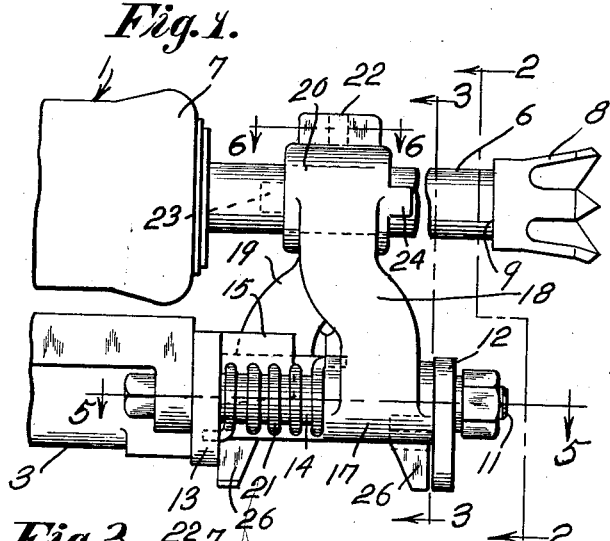

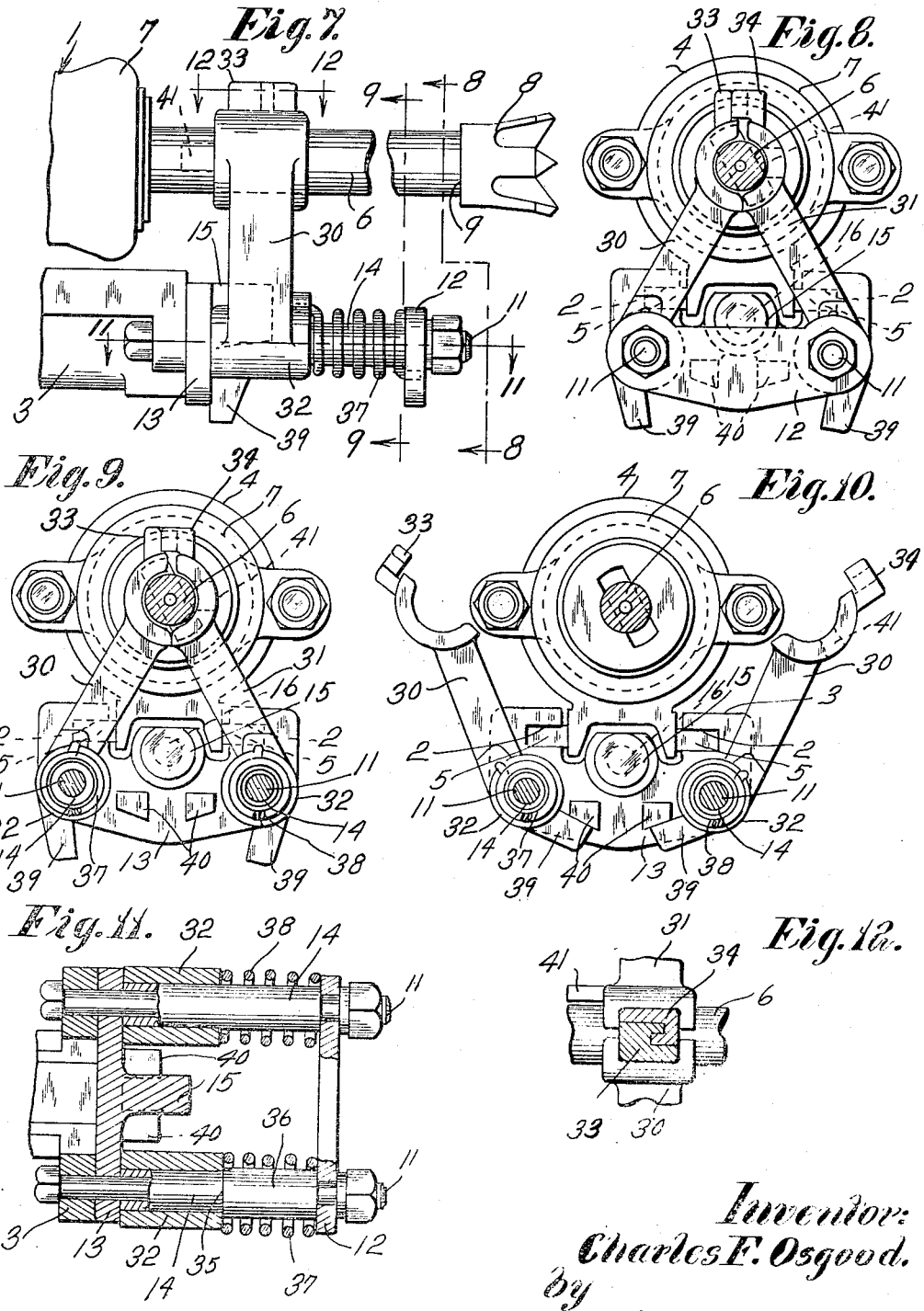

2,675,997

UNITED STATES PATENT OFFICE 2,675,997

DRILL STEEL GUIDE

Charles F. Osgood, Franklin, Pa., assignor to Joy Manufacturing Company, a corporation of Pennsylvania Continuation of application Serial No. 539,833, June 12, 1944. This application June 18, 1947, Serial No. 755,428

1 Claim. (Cl. 255—51)

This invention relates to rock drills and more particularly to an improved guide for a drill steel of a rock drill of the mounted type.

In rock drills of the mounted type, the drilling motor which actuates the drill steel is usually mounted on an elongated guiding support suitably positioned near the face of the work, and feeding means is usually provided for moving the drilling motor either forwardly or rearwardly along the guiding support. For guiding the drill steel during the starting or "spotting" of a drill hole in the working face, there is usually provided at the forward end of the guiding support a guide for maintaining the drill steel in centered position, and it is desirable that such guide be automatically released from the drill steel as the drilling motor approaches the guide during forward feed, so that undesired striking of the drilling motor against the guide is prevented, and movement of the forward end of the drilling motor forwardly past the steel guide may be permitted. In certain types of mounted rock drills, such as wagon or tower drills, it is also desirable to effect automatic release of the guide from the drill steel as the drilling motor is fed rearwardly along the guiding support subsequently to the starting of a hole with a short drill steel, thereby to prevent accidental striking of the drill bit against the steel guide, and permitting movement of the drill bit rearwardly past the steel guide. It is accordingly desirable in such drills to provide a steel guide which is always automatically released from the drill steel when the drilling motor assumes a predetermined position on its guiding support during either forward feed or retraction along the support-guideways to prevent the drilling motor and the drill bit from striking against the guide while the latter is held in steel guiding position, thereby eliminating the possibility of damage to the guide or other drill parts.

It is an object of the present invention to provide an improved drill steel guide which is automatically moved out of guiding relation with the drill steel when the drilling motor assumes a predetermined position along the guideways of its guiding support irrespective of the direction of movement of the drilling motor along the support-guideways. Another object is to provide an improved drill steel guide which is always automatically released from guiding relation with the drill steel as the drilling motor is fed in either of opposite directions along its guiding support. A further object is to provide an improved drill steel guide which is always automatically released from the drill steel either by direct engagement of the drilling motor therewith as the latter is fed forwardly along its guiding support or by direct engagement of the drill bit with said guide as the drilling motor is fed rearwardly along the guiding support. Yet another object is to provide an improved drill steel guide having improved mounting means for the guiding elements thereof and improved means for holding the guiding elements in guiding relation with the drill steel. A still further object is to provide an improved drill steel guide having the guiding elements thereof mounted for translatory movement in relatively opposite directions from their locked guiding position. A further object is to provide an improved means for holding the guiding elements in steel guiding position and wherein the locking means is releasable by translatory movement of either of the guiding elements relative to the other. Yet another object is to provide an improved drill steel guide wherein the guiding elements are locked directly together in steel guiding position, and wherein the guiding elements are moved out of locked relation by direct engagement of the drilling motor with one of the guiding elements or by direct engagement of the drill bit with the other of the guiding elements. Other objects and advantages of the invention will, however, hereinafter more fully appear.

This application is a continuation of my application, Serial No. 539,833, filed June 12, 1944, now abandoned.

In the accompanying drawings there are shown for purposes of illustration two forms which the invention may assume in practice.

In these drawings:

Fig. 1 is a fragmentary side elevational view of a mounted rock drill with which an illustrative embodiment of the invention is associated.

Fig. 2 is a cross-sectional view taken substantially on line 2—2 of Fig. 1, showing the drill steel guide in front elevation.

Fig. 3 is a cross-sectional view taken substantially on line 3—3 of Fig. 1 and illustrating structural details.

Fig. 4 is a cross-sectional view taken on the plane of Fig. 3, showing the steel guide in its wide open, non-guiding position.

Fig. 5 is a horizontal sectional view taken substantially on line 5—5 of Fig. 1.

Fig. 6 is a detail sectional view taken on line 6—6 of Fig. 1, illustrating the interlock between the guiding elements.

Fig. 7 is a fragmentary side elevational view, similar to Fig. 1, illustrating another embodiment of the invention.

Fig. 8 is a cross-sectional view taken substantially on line 8—8 of Fig. 7, showing the guide in front elevation.

Fig. 9 is a cross-sectional view taken substantially on line 9—9 of Fig. 7, showing the steel guide in guiding position.

Fig. 10 is a cross-sectional view taken on the plane of Fig. 9, showing the guide in its wide open, non-guiding position.

Fig. 11 is a horizontal sectional view taken substantially on line 11—11 of Fig. 7.

Fig. 12 is a detail sectional view taken on line 12—12 of Fig. 7, showing the guide interlock.

In both illustrative embodiments of the invention, the improved drill steel guide is shown associated with a conventional rock drill of the mounted type. It will be evident, however, that the improved guide may be associated with tools of various other types.

The rock drill disclosed herein comprises a conventional hole drilling mechanism herein a drilling motor or drill steel actuator 1 mounted for movement back and forth along the guideways 2, 2 of a conventional guiding support 3. The drilling motor is of a well known pressure fluid operated, percussive type having a motor cylinder 4 provided with lateral guides 5, 5 slidingly received in the guideways 2. The motor cylinder contains a usual reciprocatory hammer piston for percussively actuating a drill steel 6 suitably mounted in a front chuck housing 7, the latter in turn being suitably attached to the front end of the motor cylinder. The drill steel carries a usual detachable drill bit 8 having a rearwardly facing annular shoulder 9 of larger diameter than the steel body. The drilling motor 1 may be fed along the guideways of the guiding support in any conventional manner either manually or by power, and, in this instance, a conventional motor driven feed screw, journaled on the guide shell, and engaging a non-rotatable feed nut carried by the motor cylinder, is employed to feed the percussive motor. Since, as above stated, the rock drill is of a conventional design and is well known to those skilled in the art, further disclosure thereof is herein unnecessary.

In the illustrative embodiment of the invention shown in Figs. 1 to 6 inclusive, it will be noted that attached, as by a pair of longitudinally extending, parallel bolts 11, to the forward end of the guiding support 3 are parallel, front and rear, transverse end-plates 12 and 13, held in proper spaced relation by spacing sleeves 14 surrounding the bolts between the plates. Formed integral with the rear end-plate is a centrally located bearing boss 15 in which a front bearing portion 16 of the feed screw is journaled, as clearly shown in Fig. 3. Pivotally mounted on the spacing sleeves 14 intermediate the plates 12 and 13, for swinging movement in transverse planes, are the hubs 17 of a pair of cooperating guide arms 18 and 19. These guide arms are identical in design and each has an appropriately shaped guiding portion 20 for engaging the drill steel. The guide arms are reversely positioned between the plates and are mounted on the spacing sleeves 14 for translatory sliding movement in relatively opposite directions, lengthwise of the drill steel. Arranged between the end-plates and engaging the arm hubs 17 are combined torsion and compression springs 21, 21, and one of the arms is held by its spring in a rearward position against the front surface of the rear plate while the other arm is held by its spring in a forward position against the rear surface of the front plate, in the manner shown in Fig. 5. These springs are each at one end secured to an end-plate and at their other end to an arm hub, and constantly tend to swing the arms outwardly toward their wide open, non-guiding position. The guiding portions 20 of the arms have projections 22 which are disposable in laterally overlapping, interlocking relation, as shown in Fig. 6, to hold the guide arms against outward swinging movement in guiding relation with the drill steel. The arms are held together in interlocked relation against the action of the torsion springs. One of the guide arms (the one whose hub normally rests against plate 13) has a rearward projection 23 which is engageable by the front end of the chuck housing 7 of the drilling motor while the other arm has a forward projection 24 which is engageable by the rearwardly facing shoulder 9 of the drill bit, in a manner to be later explained. The arm hubs have projections 25 which are engageable with abutments 26 on the end-plates to limit outward swinging movement of the arms.

The mode of operation of the embodiment above described will be clearly apparent from the description given. When the rock drill is suitably positioned with respect to the working face and it is desired to start or "spot" a drill hole, the guide arms 18 and 19 may be manually swung inwardly against the action of the torsion springs from the position shown in Fig. 4 to the position shown in Fig. 3, and one of the arms may be slid translationally along its spacing sleeve to bring its projection 22 in interlocking relation with the projection on the other arm so that the guiding portions 20 are interlocked together to hold the guide arms in guiding relation with the steel. The coil springs 21 are under compression and serve to hold the arms against the end-plates while in this interlocked steel guiding position, and the torsion springs, tending to swing the arms apart, hold the interlocked projections 22 tightly together. After the drilling motor has been fed along the guideways of the guiding support to feed the drill bit 8 toward the work and the drill bit has penetrated the work a substantial distance, the front end of the chuck housing 7 engages the projection 23 on the arm 19 to slide the latter forwardly translationally along its spacing sleeve into a position wherein its locking projection 22 is released from the locking projection on the other arm to free both arms for outward swinging movement, and thereafter the torsion springs act quickly to swing the guide arms apart into their wide open, non-guiding position shown in Fig. 4 so that, upon continued forward movement of the drilling motor, the chuck housing may move between the guide arms forwardly past the guide. When the drill hole is started or "spotted" with a short drill steel, as is frequently the case in wagon or tower drills, it is also desirable to have the steel guide open automatically as the drill bit is retracted from the work, and, during rearward movement of the drilling motor along the support guideways, the rearwardly facing shoulder 9 on the drill bit engages the projection 24 on the arm 18 to move the latter translationally rearwardly along its spacing sleeve to release its projection 22 from interlocking relation with the projection on the other arm. When the guide arms are unlocked, the torsion springs act quickly to swing the arms wide apart so that, upon continued rearward movement of the drilling motor, the drill bit may move rearwardly past the guide arms. It is accordingly evident that irrespective of the direction of movement of the drilling motor along the support-guideways, the guide arms are always automatically released from guiding relation with the drill steel, thereby to prevent either the chuck housing or the drill bit striking against the guide while the latter is held closed, which might result in damage to the guide or other drill parts. When the guide arms reach their wide open, non-guiding position as shown in Fig. 4, the arm projections 25 engage the end-plate abutments 26 so that further outward movement of the arms is prevented.

In the embodiment of the invention shown in Figs. 7 to 12 inclusive, the end-plates, attaching bolts and spacing sleeves are similar to those above described. In this construction, a pair of cooperating guide arms 30 and 31 have hubs 32 pivotally mounted on the spacing sleeves and having appropriately shaped portions 33 and 34 for engaging the drill steel and disposable together in interlocked relation, as shown in Fig. 12. The arm 30 is held against translatory sliding movement along its spacing sleeve by a rearwardly facing shoulder 35 on an enlarged portion 36 of the sleeve, and a torsion spring 37 surrounding the sleeve between the front end-plate and the arm hub constantly urges the arm outwardly about its pivot toward its wide open, non-guiding position. The other arm 31 is mounted on its spacing sleeve for translatory sliding movement and is held by a combined torsion and compression spring 38 rearwardly against the front surface of the rear plate. The springs each have one end secured to the front plate and the other end attached to an arm hub. The arm hubs have projections 39 engageable with abutments 40 on the rear plate for limiting outward swinging movement of the arms, in the manner shown in Fig. 10. The arm 31 has a rearward projection 41 engageable by the front end of the chuck housing.

The mode of operation of this modified embodiment is as follows: As the drilling motor is fed forwardly along the support-guideways during feed of the drill bit toward the work and the drill bit has penetrated the work a substantial distance, the front end of the chuck housing 7 engages the projection 41 on the arm 31 and slides the arm 31 translationally forwardly along its spacing sleeve into a position wherein the interlocking relation between the steel engaging portions 33 and 34 of the arms is released. When the guide arms are unlocked, the torsion springs act quickly to swing the arms about their pivots into the wide open, non-guiding position shown in Fig. 10, so that, as forward feed of the drilling motor continues, the chuck housing may move forwardly between the guide arms beyond the guide. In this embodiment, release of the guide by the drill steel during retraction of the percussive motor is not present, and the guide is releasable automatically from the drill steel only by direct engagement of the drilling motor therewith during forward feed of the drilling motor. When the arms reach their wide open, non-guiding position shown in Fig. 10, the arm projections 39 engage the plate abutments 40 to prevent further outward swinging movement. The arms 30 and 31 may be swung inwardly manually from the position shown in Fig. 10 to the position shown in Fig. 9 against the action of the torsion springs, and the arm 31 may be slid forwardly translationally along its spacing sleeve and then rearwardly to bring the steel engaging portions of the arms in interlocked relation.

As a result of this invention, it will be noted that an improved drill steel guide is provided which has the steel engaging portions of its guide arms connectible together in interlocked relation, and releasable upon translatory movement of one arm relative to the other arm. It will further be evident that an improved drill steel guide is provided which is automatically released from guiding relation with the drill steel when the drilling motor assumes a predetermined position on its guiding support. In one embodiment, the steel guide is automatically released from guiding relation with the drill steel during either forward or reverse movement of the drilling motor along the support guideways. It will further be evident that by the improved manner of mounting and arrangement of the guide arms, the steel guide is automatically released from guiding relation with the drill steel in an extremely effective manner. Further, by interlocking the steel engaging portions of the arms directly together and by effecting release of the guide arms by bodily movement of one guide arm relative to the other, all complicated releasing and actuating devices are eliminated. Other uses and advantages of the improved drill steel guide will be clearly apparent to those skilled in the art.

While there are in this application specifically described two forms which the invention may assume in practice, it will be understood that these forms of the same are shown for purposes of illustration and that the invention may be modified and embodied in various other forms without departing from its spirit or the scope of the appended claim.

What I claim as new and desire to secure by Letters Patent is:

A drill steel guide comprising a pair of coacting guide arms movable relative to each other and having guiding portions adapted to embrace the body of a drill steel for guiding the latter, pivot-providing and guiding means for mounting said guide arms for pivotal movement in transverse planes into and out of guiding relation with the drill steel and for bodily guided movement one relative to the other in relatively opposite directions from their normal guiding positions lengthwise of the drill steel, said mounting means including oppositely extending, parallel, longitudinal guides along which said arms are guided for such bodily movement, oppositely acting coil springs surrounding said guides and acting on said arms respectively for urging said arms in relatively opposite directions along their guides from their guiding positions, and releasable locking means for locking said guide arms directly together near the guiding portions thereof in steel guiding position and yieldingly held in locked position by said oppositely acting springs, such bodily movement of either one of said guide arms from its guiding position along its guide relative to the other arm effecting release of said locking means, said springs opposing movement of said arms toward their unlocked positions.

References Cited in the file of this patent

UNITED STATES PATENTS

| Number | Name | Date |
|---|---|---|
| 2,055,520 | Curtis | Sept. 29, 1936 |
| 2,350,658 | Curtis | June 6, 1944 |